Nov. 10, 1964 D. E. RUTTER 3,156,919

ELECTROMAGNETIC TRANSDUCER HEAD

Filed Dec. 30, 1960 2 Sheets-Sheet 1

INVENTOR
DONALD E. RUTTER
BY John S. Gasper
ATTORNEY

Nov. 10, 1964 D. E. RUTTER 3,156,919

ELECTROMAGNETIC TRANSDUCER HEAD

Filed Dec. 30, 1960 2 Sheets-Sheet 2

United States Patent Office 3,156,919
Patented Nov. 10, 1964

3,156,919
ELECTROMAGNETIC TRANSDUCER HEAD
Donald E. Rutter, Vestal, N.Y., assignor to International Business Machines Corporation, New York, N.Y., a corporation of New York
Filed Dec. 30, 1960, Ser. No. 79,875
4 Claims. (Cl. 346—74)

This invention relates to magnetic recording and, in particular, to a magnetic transducing head.

While not necessarily limited thereto, the subject invention relates to a magnetic transducing head particularly useful in the magnetic printing process.

As is well known to persons skilled in the art, magnetic printing involves the formation of magnetic images on a magnetizable surface. The images which are representative of data to be recorded are rendered visible by the application of minute magnetic particles to the image-bearing surface where they are selectively retained in accordance with the image pattern. The particle image is then transferable to a print medium such as paper where it may be fixed to form a permanent copy of the data.

In one version of magnetic printing, the magnetic image is formed as a mosaic of magnetic dots or the like on the magnetizable surface. One type of magnetic transducer head which has been found to be particularly suitable for producing magnetic images on a movable magnetizable surface is the multi-element or stylus magnetic return path recording head. A principal advantage of such a transducer head is that the magnetic dots formed with a plurality of uniplanar magnetic core elements or styli have concentric polarities. Previously, such transducer heads have had the styli wound with a single turn conductor. While certain advantages were to be obtained with a single turn winding (e.g., the winding may form the recording gap between stylus and magnetic return path member and is close to the recording surface), such a construction required energy transformer devices which increased cost and tended to complicate the structure.

One approach to eliminate the energizing transformer is to provide a multi-turn energizing winding for the stylus. However, attempts to provide such construction with a magnetic return path pose certain problems such as spacing, magnetic flux density proximate the recording surface and others which frustrate compactness in design with sharpness in magnetic images such as are desirable in magnetic printing.

It is therefore the principal object of the present invention to provide an improved multiple stylus multiple turn winding recording magnetic transducing head having a magnetic return path which will overcome the aforesaid problems and attain the desired characteristics.

It is a still further object to provide a magnetic transducer head of the above type suitable for use with other like heads in a multiple track magnetic recording assembly.

The above and other objects and advantages may be obtained in accordance with the practice of the present invention by providing a recording device comprising a plurality of cores of magnetic material and means including a base member of flux permeable material for positioning the axes of said core so that the ends thereof are supported transverse to a recording surface. It is a feature of the present invention that the magnetic cores be individually wound with a plurality of turns of conductor and that the base member be a thin plate in peripheral contact with the recording ends of the core members.

In the preferred embodiment, the core members are cylindrical styli having a reduced recording portion referred hereinafter as a peg portion connected to a main body portion by a tapered section. A multiple turn winding is peripherally in contact with the main and tapered portions only of the core members, while a gap forming sleeve member of non-magnetic material is placed over the peg end thereof.

The base member is provided with a row of holes in a center portion thereof. The pegs with peripheral sleeves are insertable therein. The opposite ends of the core members are affixed to base member with good magnetic contact at a point remote from the recording ends of the magnetic cores. To attain compactness, the core members are alternately connected to opposite ends of the plate member.

In the preferred form, the plate member takes the form of a U-shaped clip insertable into a corresponding recess of a supporting block. For this purpose, the plate member is preferably formed of electrical iron having the remote ends bent outwardly and then inwardly to form shoulders. Openings in the ends of the inwardly bent extensions of the shoulders serve to receive the core members at their ends remote from the recording surface. Compactness is achievable by connecting alternate core members to opposite shoulders.

In the preferred embodiment, the plate member is a U-shaped member having a flat portion at the recording end with the wing portions being bent at the upper remote ends thereof. It has been discovered that improved recording is obtained if the flat recording portion is substantially thinner in cross section than the winged portions.

Preferably, it has been found that improved results are obtainable where the center portion has a peripheral contact area approximately equal to the transverse cross-sectional area of the cylindrical peg and that the cross-sectional area of the wing portions be at least equal to the transverse cross-sectional area of the main body portion of the core members.

The foregoing and other objects, features and advantages of the invention will be apparent from the following more particular description of preferred embodiments of the invention, as illustrated in the accompanying drawings.

Figures 1, 2, 3:
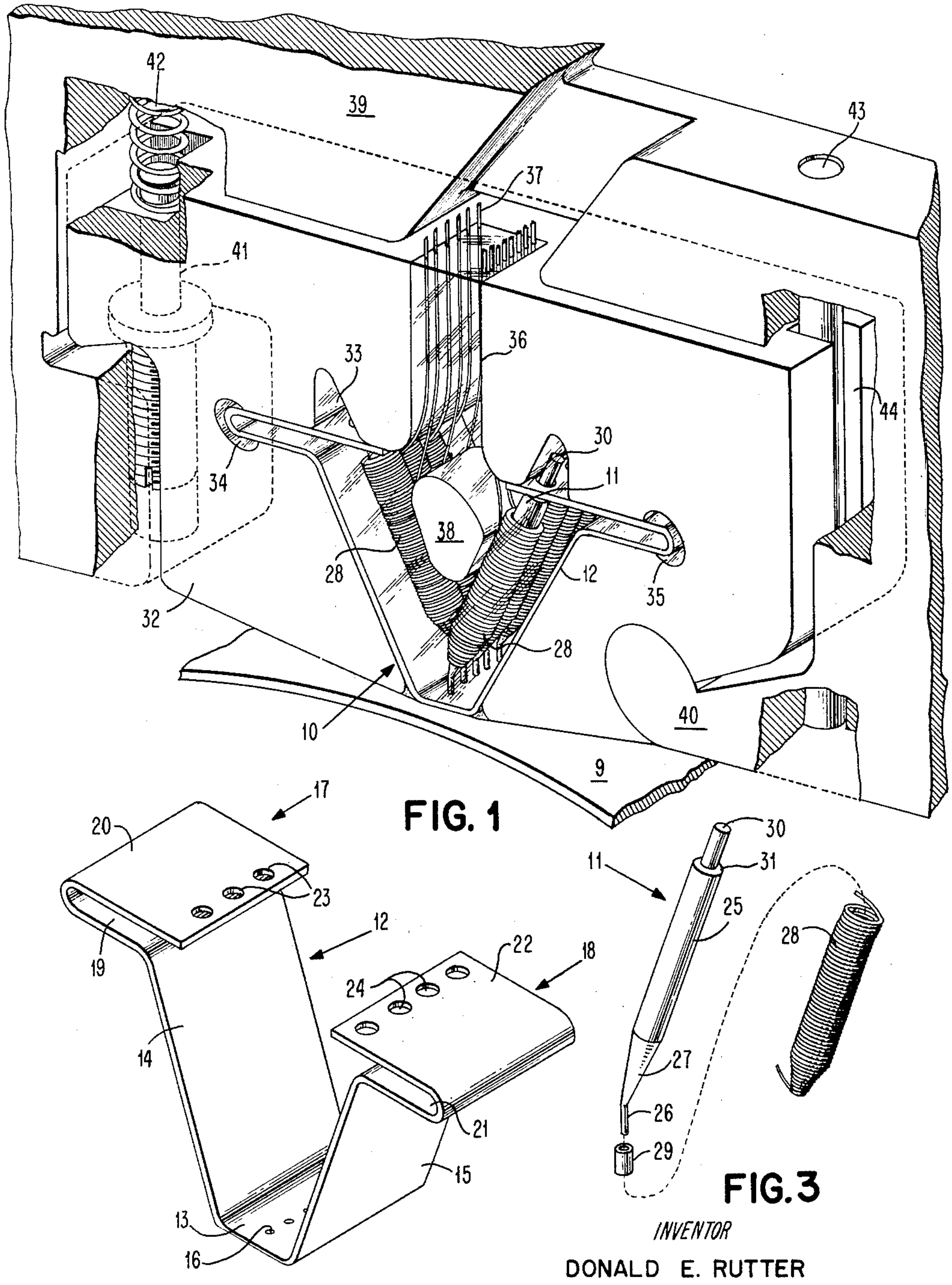
FIG. 1 is a perspective view of a recording device assembly utilizing a recording device embodying the principles of the present invention with portions of the assembly cut away or shown transparent to illustrate details of construction.
FIG. 2 is a perspective view of the base member of the recording device of FIG. 1.
FIG. 3 is an exploded isometric of the magnetic core member assembly of FIG. 1.

Referring to the drawings, particularly to FIGS. 1, 2 and 3, an assembly 10 is shown which has particular utility for magnetic printing on a magnetizable surface 9. A recording device comprising a plurality of cylindrical cores 11 are mounted on a base member plate 12. As is seen more clearly in FIG. 2, the base member plate 12 is essentially U-shaped having a flat recording center portion 13 with upwardly extending left and right wing portions 14 and 15. The flat center portion 13 is provided with a transverse row of holes 16 into which one end of the core members 11 is placed. Shoulders 17 and 18 are formed on the upper ends of the wing portions 14 and 15. In the preferred manner, shoulders 17 and 18 are formed with the wing portions bent to provide outward and inward extensions 19, 20, 21 and 22, respectively. The ends of inward extensions 20 and 22 are provided with transverse rows of holes 23 and 24, respectively.

The details of construction of the core members 11 may be seen by reference to FIG. 3. A cylindrical core member 11, also called a stylus, is shown having a main body portion 25 and a recording portion or peg 26. A principal characteristic of the core member in this embodiment is that the peg 26 has a reduced transverse cross-section from the main body portion 25 and that the two portions be connected by a smoothly tapered section 27. A multiple turn winding 28 is wound preferably on the main body portion 25 and the tapered section 27. A gap forming sleeve 29 having uniform wall thickness and formed of non-magnetic material is applied to the peg 26. For connection of the core members 11 to the base member 12, the upper ends may have a reduced cross-section connection extension 30 extending from shoulder 31. The extensions 30 are insertable in the holes 23 and 24 in shoulders 17 and 18 of base member 12.

In the preferred embodiment, core members 11 and plate member 12 are made of electrical iron, core members 11 being formed from electrical iron wire stock. The core members 11 are machined to form the taper 27, peg 26, and extension 30. The sleeve 29 and windings 28 are then applied. The sleeve may be formed by a plating process directly on the peg 26 after which a copper conductor is wound directly on the body portion 25 and taper section 27.

In the preferred form, the base member 12 is made by cutting a length of thin flat electrical iron. Holes 16, 23 and 24 are formed therein by punching or drilling, preferably as a single operation. The shoulders 17 and 18 are then formed by bending in a suitable manner. In the preferred embodiment, the core members 11, or styli, are preferably staggered with every other core member 11 being bent to the opposite direction. After winding and plating of the core members, the plated peg portions 26 are placed in the holes 16 in the center portion 13 of the base member plate 12.

Every other core member 11 is bent and inserted into a corresponding hole 23 or 24 in the left and right inward extensions 20 and 22 of plate member 12. In preparing the plate member 12 for assembly with the core members 11, the inward extensions need not be bent until after assembly of the core members 11. However, various modifications may be practical with electrical iron to effect the insertion of the extensions 30 of core members 11 into holes 23 and 24 of the extensions 20 and 22.

Sleeve member 29 instead of being copper plating or the like, could be glass tubing for example. In that event the assembly of core members 11 to plate member 12 may be accomplished after sleeve members 29 are placed in holes 16. The pegs 26 would be threaded into the sleeve portions 29 when assembled on plate member 12.

Following the assembly of core members 11 to base member 12, the assembly is mounted on a support block 32 of non-magnetic material such as phenolformaldehyde. The support block 32 is preferably molded with a recess 33 having recess extensions 34 and 35 to accommodate the shoulders 17 and 18 of base member 12. A center recess extension 36 provides a channel for the ends 37 of windings 28. Following assembly of the magnetic recording device 10 to support block 32, an isolation member 32 may be inserted between core members 11 extending to the opposite shoulders 17 and 18 and the recess 32 with all its extensions 34, 35 and 36 may be filled with a hardenable plastic. The entire assembly is then mountable on a suitable support frame 39 where it may be pivotally adjustable about a hinge extension 40 by manipulation of an adjusting screw 41 provided with a biasing spring 42. A retaining pin 43 extends through a groove 44 in the hinged end of support block 32 and aligned openings in the frame member 39.

Figure 5:
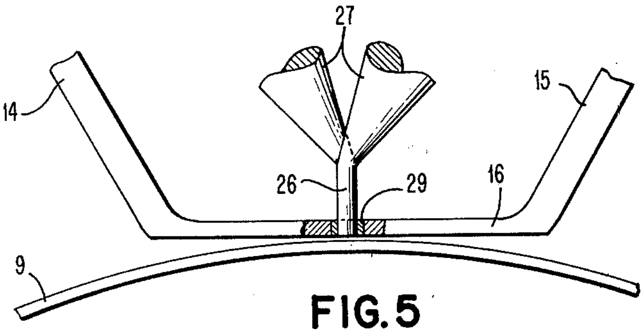
FIG. 5 is a fragmentary view of a front elevation of the core and base member illustrating the princple of the reduced section return path in the recording end of the base portion.

In the preferred form, the center portion 13 of base member plate 12 has a reduced cross-section, thereby providing the pegs 26 of core members 11 with a reduced peripheral area of contact. This may be seen more clearly in FIG. 5. In particular, the cross-sectional area is approximately equal to the transverse cross-sectional area of the peg portions 26 of core member 11 while the wing and shoulder portions have a cross-sectional area at least as large or preferably larger than the transverse cross-section of the main body portion 25. A particular assembly was provided having a plate member 12 of .006 inch thickness electrical iron bent and shaped as previously described; a row of seven holes 16, .011 inch in diameter, on centers spaced .015 inch; seven core members 11 having a main body portion 25, .023 inch in diameter; and a peg portion 26, .006 inch in diameter. The core members were wound with 50 turns of #42 H.F. size copper conductor. The insulation is provided by a Heavy Formvar resin coat. Glass tubes having inner diameter of .0065 and outer diameter of .0105 inch were inserted into holes 16. Holes 23 and 24 were .012 inch in diameter on .030 inch centers. Holes 23 and 24 were offset from each other by .015 inch.

The center section 13 was reduced in cross-section by grinding the outer surface until the thickness of plate member 12 in center section 16 was reduced to approximately .001–.002 inch. This reduction in cross-section may be provided in various ways, but it is preferable that this be accomplished by grinding the face of the assembly including section 13, the ends of pegs 26 and sleeves 29 after they have been assembled. This operation may even be reserved until the magnetic assembly 10 has been mounted within support block 32 and potted in recess 33.

Figure 6:
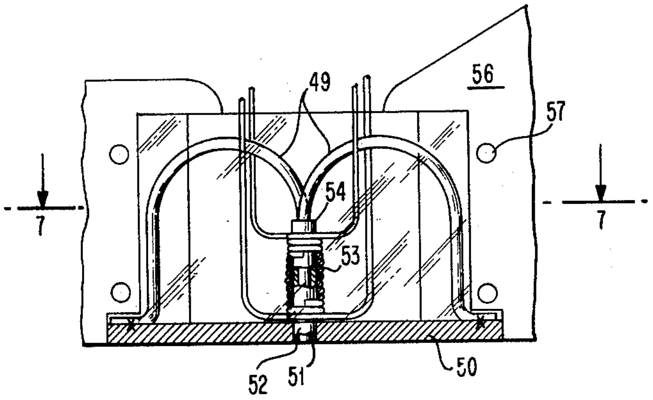
FIG. 6 is an elevation of an assembly showing a second embodiment of a recording device of the present invention.
Figure 7:
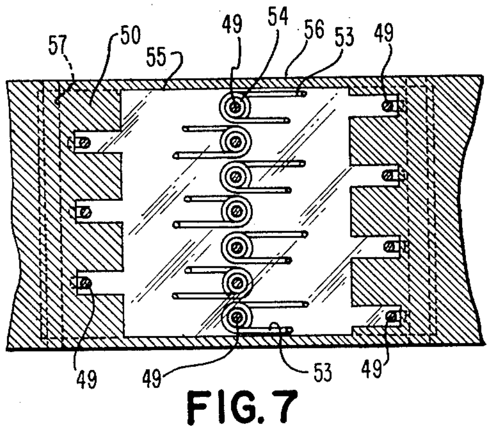
FIG. 7 is a cross-sectional view taken along line 7—7 of FIG. 6.
Figure 4:
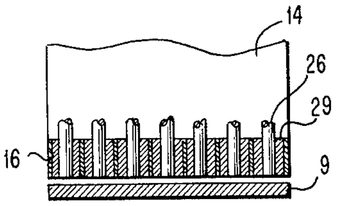
FIG. 4 is a transverse cross-section of the core and base members of the recording device of FIG. 1.

An alternate embodiment of a transducer head is shown in FIGS. 6 and 7. As there shown, a plurality of core members 49 of uniform cross-section throughout are mounted on a thin flat plate member 50 of electrical ion. A transverse row of holes 51 in plate 50 receive a gap forming sleeve 52 of non-magnetic material. Individual multi-turn energizing windings 53 are wound on a sleeve 54 of electrical iron which surrounds the core member 49 proximate the recording end. The remote end of cores 49 are attached preferably to the upper surface of plate member 50 at a point remote from the holes 51. In the preferred form, the attachment of cores 49 at their remote ends to the surface of plate member 50 is done in a manner such as welding so that a good magnetic contact is assured. This assembly is then placed in a recess 55 in a plastic support 56 which may be otherwise substantially the same as block 32 of FIG. 1. The magnetic device assembly of FIGS. 6 and 7 is then retained in place by filling recess 55 with plastic potting compound of non-magnetic material of any known variety.

While the invention has been particularly shown and described with reference to preferred embodiments thereof, it will be understood by those skilled in the art that various changes in form and details may be made therein without departing from the spirit and scope of the invention.

What is claimed is:

1. A magnetic recording device for use in producing a mosaic of concentric polarity magnetized dots on a magnetizable recording surface comprising a plurality of stylus core members of flux permeable material, said core members having recording and remote ends, said recording end terminating in a recording end surface transverse to the major axis thereof, means for supporting said core members with the axes of said recording ends thereof in linear array and with said recording end surfaces in a common plane, said supporting means including a low reluctance flux path element connected to said recording and remote ends of said core members and forming a return path to said remote ends of said core members for flux emanating from corresponding recording ends thereof, said flux return path element comprising a thin unitary flux permeable plate member, said plate member having a boundary surface positionable proximate the recording surface of said magnetizable material and a linear array of openings therein adapted to receive the record ends of said stylus members, said plate member boundary surface being coplanar with said recording end surfaces of said record ends of said stylus members and said record ends of said core members being positionable in said openings of said plate members in a manner forming a peripheral recording gap between each of said record ends of said core members and said plate member, and multiple turn energizing windings on said core members intermediate said recording and remote ends thereof.

2. A magnetic recording device in accordance with claim 1 in which said stylus members are cylindrical core elements having a cylindrical body portion of a first transverse cross-section forming said remote end thereof, a peg portion of a transverse cross-section less the said first transverse section forming the recording end thereof, and a taper section connecting said body and peg portions, said peg portions terminating in said transverse coplanar recording end surfaces, said peg portions being positioned in said openings of said plate member in a manner forming a peripheral recording gap between each of said peg portions and said plate member and with said recording end surfaces of said peg portions being coplanar with said boundary surface of said plate member, and said energizing windings being on said body and taper portions of said core member.

3. A magnetic head of the type set forth in claim 2 in which said plate member is a U-shaped clip having a substantially flat center portion positionable proximate said recording surface and a pair of upwardly extending wing portions contiguous with opposite ends of said center portion, each of said wing portions having a shoulder construction including inwardly oriented core member contacting extensions, said center portion having said linear array of openings for receiving said peg portions and said core contacting extensions having openings for receiving said body portions of said core members whereby said plate member is magnetically coupled thereby to said body portions of said core members, alternate ones of said core members being connected to opposite ones of said core member contacting extensions, and a mounting block of non-magnetic material having a recess adapted to receive and retain said U-shaped plate member with said core members therein.

4. A magnetic head in accordance with claim 2 in which said plate member is a U-shaped piece having a flat center portion and upwardly extending wing portions, said flat portion being positionable proximate said recording surface, said wing portions having mounting shoulders with inwardly extending core member connecting extensions, said extensions, said wing portions and said center portion serving as a return path for flux generated through said core members and through said recording surface, and said center portion having a cross-section less than the cross-section of said wing portions.

References Cited in the file of this patent

UNITED STATES PATENTS 2,359,617 Bryce ---------- Oct. 3, 1944
2,920,379 Hagopian ---------- Jan. 12, 1960